United States Patent Office 3,331,490
Patented July 18, 1967

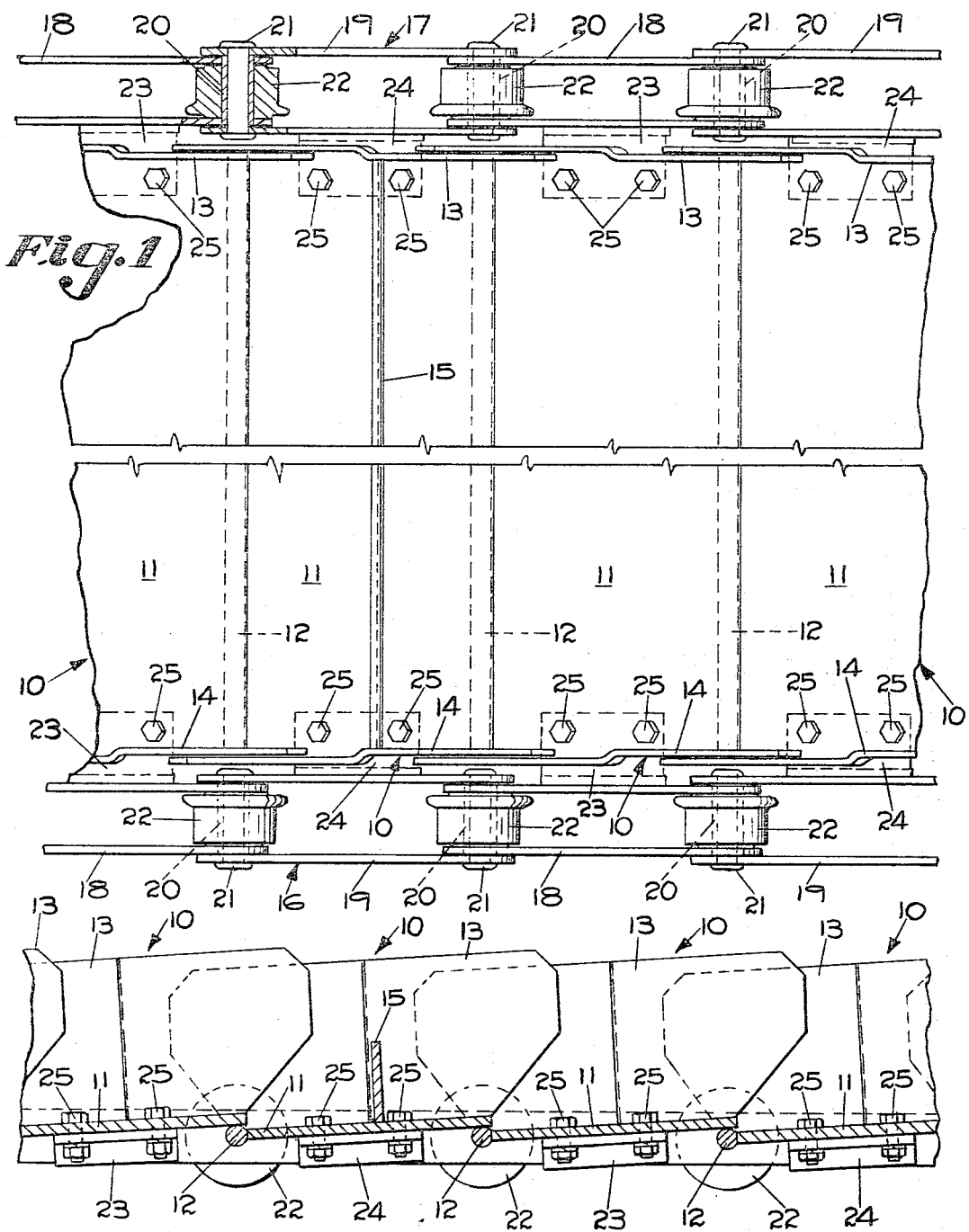

3,331,490
PAN CONVEYOR
John E. Daniels, Columbus, Ohio, assignor to Jeffrey Galion Manufacturing Company, a corporation of Ohio
Filed July 15, 1966, Ser. No. 565,537
4 Claims. (Cl. 198—196)

The instant invention relates to pan conveyors.

Pan conveyors consist of a line of pans which are arranged in succession and usually are carried by and between oppositely disposed chains. The material to be conveyed is carried within the pans. The individual pans are articulated with respect to each other so that the conveyor can bend around driving sprockets and the like, it being understood that the conveyor is constructed as an endless element which travels in a closed path.

It is an object of this invention to provide an improved construction of pan conveyor.

It is a further object of the invention to provide an improved pan conveyor in which the pans are articulated with respect to each other.

It is another object of the invention to provide an improved pan conveyor in which the pans may be easily assembled and disassembled in the conveyor.

Other objects of the invention will appear hereinafter, the novel features and combinations thereof being set forth in the appended claims.

In the drawings:

FIG. 1 is a plan view of a pan conveyor that is constructed in accordance with this invention; and FIG. 2 is a sectional elevational view of the pan conveyor.

The pan conveyor illustrated in FIGS. 1 and 2 comprises a plurality of successive pans 10 which are arranged in succession in a longitudinal line. Each pan has a bottom plate 11 which is laterally disposed. A rod 12 is placed at the rear edge of the bottom plate 11 and is secured thereto, as by welding. The rod 12 is laterally coextensive with the bottom plate 11.

Each pan 10 further includes side plates 13, 14 which are disposed at the opposite sides of the bottom plate 11. The side plates 13, 14 are disposed in an upright position and are secured to the bottom plate 11, as by welding. Each of the side plates 13, 14 is offset at the middle thereof so that the side plates 13, 14 of successive pans 10 will fit closely adjacent to each other, as best seen in FIG. 1. The material to be conveyed by the pan conveyor 10 is received in the pans on the bottom plate 11 and between the side plates 13, 14. Several of the pans 10 may include an upright blade 15 which is secured to the bottom plate 11, as by welding, and is laterally coextensive with the bottom plate 11. The blade 15 serves somewhat as a pusher element to assist in conveying the material on the pan conveyor.

The pans 10 are secured to opposite side chains 16, 17 which are identical and are oppositely disposed in the conveyor. The chains 16, 17 comprise a plurality of successive chain links 18, 19 which are alternated. As seen in FIG. 1, the side bars of the chain links 18, 19 are staggered with respect to each other, such that the side bars of the chain links 18 are disposed within the side bars of the chain links 19. Chain links 18, 19 are connected to each other by a thimble 20 and a rivet pin 21 to provide a pivot or articulated connection of the chain links 18, 19. A flanged roller 22 is rotatably mounted on each thimble 20, and the several rollers 22 at the opposite sides of the conveyor roll along tracks to support and guide the pan conveyor in its closed endless path.

Each chain link 18 has a laterally, inwardly extending bracket 23, and each chain link 19 has a similar laterally, inwardly extending bracket 24. The brackets 23, 24 are secured to the chain links 18, 19, as by welding, and are alike, except that the brackets 23 are slightly larger because the side bars of the chain links 18 are set inwardly of the side bars of the chain links 19. The bottom plates 11 of the pans 10 are releasably secured to the brackets 23, 24 by a plurality of bolts 25, 25.

The bottom plate 11 of each pan 10 is inclined upwardly in the forward direction, as best seen in FIG. 2. The leading edge of each bottom plate 11 overlaps and bears against the rod 12 at the trailing edge of the bottom plate 11 which is immediately ahead in the line of pans 10. The brackets 23, 24 are secured to the chains 16, 17 in an inclined position, thereby to place the bottom plates 11 in inclined position, as described. The rod 12 at the trailing edge of each bottom plate 11 is disposed on the axis of the opposite rivet pins 21. Thus, the chain links 18, 19 and the conveyor pans 10 articulate together. As one conveyor pan 10 articulates with respect to the next following conveyor pan 10, the rod 12 at the trailing edge of the one conveyor pan 10 turns relatively to the leading edge of the next following pan 10. However, contact is maintained between the adjacent pans 10, even though this construction does not actually provide a hinge between such adjacent pans 10. Thus, there is the necessary freedom of movement of the adjacent pans 10 relatively to each other, by the simplified construction of this invention, and there is no gap between the adjacent pans 10, so that the material is retained in the pans 10.

In order to properly service the conveyor, it is necessary that it be possible to remove the pans 10 from the conveyor assembly. In accordance with the construction of this invention, this is readily accomplished by removal of the several bolts 25, 25 which releases the pans 10 from the side chains 16, 17. Even when the pan conveyor is installed with minimum clearance around the conveyor, it is possible to assemble and disassemble the pans 10 with the bolts 25.

Obviously those skilled in the art may make various changes in the details and ararngement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. A pan conveyor having a plurality of pans arranged in succession in a longitudinal line, each pan comprising a bottom plate that is a flat element and a rod which are laterally disposed in said longitudinal line of successive pans, the bottom plate of one pan having its leading end overlapping and bearing on the trailing end of the bottom plate of the next adjacent pan ahead of said one pan, said trailing end of the pan bottom plate being formed by said laterally disposed rod, means to secure said rod to said flat element of the pan bottom plate in the laterally disposed position to form the trailing end of the pan bottom plate, said rod being disposed in coplanar position with said flat element of the pan bottom plate to form a rearward extension thereof with a curved surface for receiving the leading end of the next adjacent pan in abutting position, means to articulate adjacent pans about the axis of said laterally disposed rod in which the leading end of one pan bottom plates moves relatively to the trailing end of the adjacent pan bottom plate on the curved surface of said lateral rod.

2. A pan conveyor as recited in claim 1 in which said rod is a solid cylindrical element with a diameter that is greater than the thickness of said flat element of the pan bottom plate.

3. A pan conveyor as recited in claim 1 in which said rod is welded to said flat element of the pan bottom plate.

4. A pan conveyor as recited in claim 1 in which said means to articulate adjacent pans comprises a chain at the side of the line of pans, said chains having a plurality of chain links, means to connect said chain links for articulation relatively to each other, and means to connect each pan to a chain link.

References Cited

UNITED STATES PATENTS

| | | | |
|---|---|---|---|
| 588,459 | 8/1897 | Mayo | 198—197 X |
| 1,432,076 | 10/1922 | Mellin | 198—196 X |
| 1,804,423 | 5/1931 | Krenzke | 198—196 |
| 1,854,334 | 4/1932 | Jensen et al. | 198—196 |
| 2,416,634 | 2/1947 | McBride | 198—196 |
| 2,922,513 | 1/1960 | Hapman | 198—196 |
| 2,989,169 | 6/1961 | Clapp et al. | 198—196 |
| 3,044,604 | 7/1962 | Steigleder | 198—196 X |
| 3,214,008 | 10/1965 | Warrick | 198—196 |

EVON C. BLUNK, *Primary Examiner.*

M. L. AJEMAN, *Assistant Examiner.*